US012811932B2

(12) United States Patent
Arana et al.

(10) Patent No.: US 12,811,932 B2
(45) Date of Patent: Nov. 24, 2026

(54) MEDIATION OF ENTITLEMENT TRANSFERS AMONG AFFILIATED DOMAINS

(71) Applicant: Disney Enterprises, Inc., Burbank, CA (US)

(72) Inventors: Mark Arana, West Hills, CA (US); Edward C. Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 401 days.

(21) Appl. No.: 15/982,985

(22) Filed: May 17, 2018

(65) Prior Publication Data

US 2019/0356658 A1 Nov. 21, 2019

(51) Int. Cl.

| | |
|---|---|
| ***H04L 9/40*** | (2022.01) |
| ***H04L 9/06*** | (2006.01) |
| *H04L 67/104* | (2022.01) |

(52) U.S. Cl.

CPC ........ *H04L 63/0876* (2013.01); *H04L 9/0637* (2013.01); *G06Q 2220/18* (2013.01); *H04L 67/104* (2013.01)

(58) Field of Classification Search

CPC . H04L 9/0637; H04L 67/104; H04L 63/0876; G06Q 2220/18

USPC .......................................................... 705/59

See application file for complete search history.

(56) References Cited

U.S. PATENT DOCUMENTS

| | | | |
|---|---|---|---|
| 2006/0161479 A1* | 7/2006 | Nashed et al. | |
| 2008/0154780 A1* | 6/2008 | Soukup et al. | |
| 2009/0307759 A1 | 12/2009 | Schnell et al. | |
| 2012/0254954 A1 | 10/2012 | Wald et al. | |
| 2017/0116693 A1* | 4/2017 | Rae et al. | |

(Continued)

FOREIGN PATENT DOCUMENTS

| | | |
|---|---|---|
| EP | 2 463 799 A1 | 6/2012 |
| EP | 2463799 | 6/2012 |

(Continued)

OTHER PUBLICATIONS

Chang et al.; Multimedia rights management for the multiple devices of end-user (Year: 2003).*

Office Action dated Mar. 13, 2026 for EP Application 19174856.5.

*Primary Examiner* — Nilesh B Khatri
*Assistant Examiner* — Yin Y Choi
(74) *Attorney, Agent, or Firm* — Farjami & Farjami LLP

(57) ABSTRACT

According to one implementation, a system for mediating entitlement transfers among affiliated domains includes a computing platform having a hardware processor and a system memory storing a software code and an entitlement ledger. The hardware processor executes the software code to receive a request on behalf of a user. The user has an entitlement to an asset in a first of the affiliated domains. The request is received from a second domain where the user does not have the entitlement. The hardware processor further executes the software code to authenticate the second domain as one of the affiliated domains, authenticate the entitlement in the first domain, transfer the entitlement to the second domain to enable the user to access the asset in the second domain, and generate a ledger entry corresponding to the transfer in the entitlement ledger.

16 Claims, 4 Drawing Sheets

(56) References Cited

U.S. PATENT DOCUMENTS

| | | | |
|---|---|---|---|
| 2018/0159912 | A1* | 6/2018 | LaJoie et al. |
| 2019/0036907 | A1* | 1/2019 | Mathew et al. |
| 2019/0215564 | A1* | 7/2019 | Webb et al. |

FOREIGN PATENT DOCUMENTS

| | | | |
|---|---|---|---|
| JP | 2004/236182 | A | 8/2004 |
| JP | 2004/280796 | A | 10/2004 |
| JP | 2015/510196 | A | 4/2015 |
| JP | 2017-204070 | | 11/2017 |
| JP | 2017/207937 | A | 11/2017 |
| KR | 2011-0036529 | | 4/2011 |
| WO | WO 2013120100 | | 8/2013 |
| WO | WO2013120100 | A1 * | 8/2013 |

* cited by examiner

MEDIATION OF ENTITLEMENT TRANSFERS AMONG AFFILIATED DOMAINS

BACKGROUND

Personal communication devices such as smartphones and tablet computers, for example, are now widely utilized as portable entertainment systems. One of the benefits enjoyed by users of such devices is that access to media content, such as movie or television (TV) content, is more available than ever before. Further to increasing the availability of such content are content subscription services that may entitle a subscriber to access a large library of movies or TV episodes.

SUMMARY

There are provided systems and methods for mediating entitlement transfers among affiliated domains, substantially as shown in and/or described in connection with at least one of the figures, and as set forth more completely in the claims.

DETAILED DESCRIPTION

Figure 1:
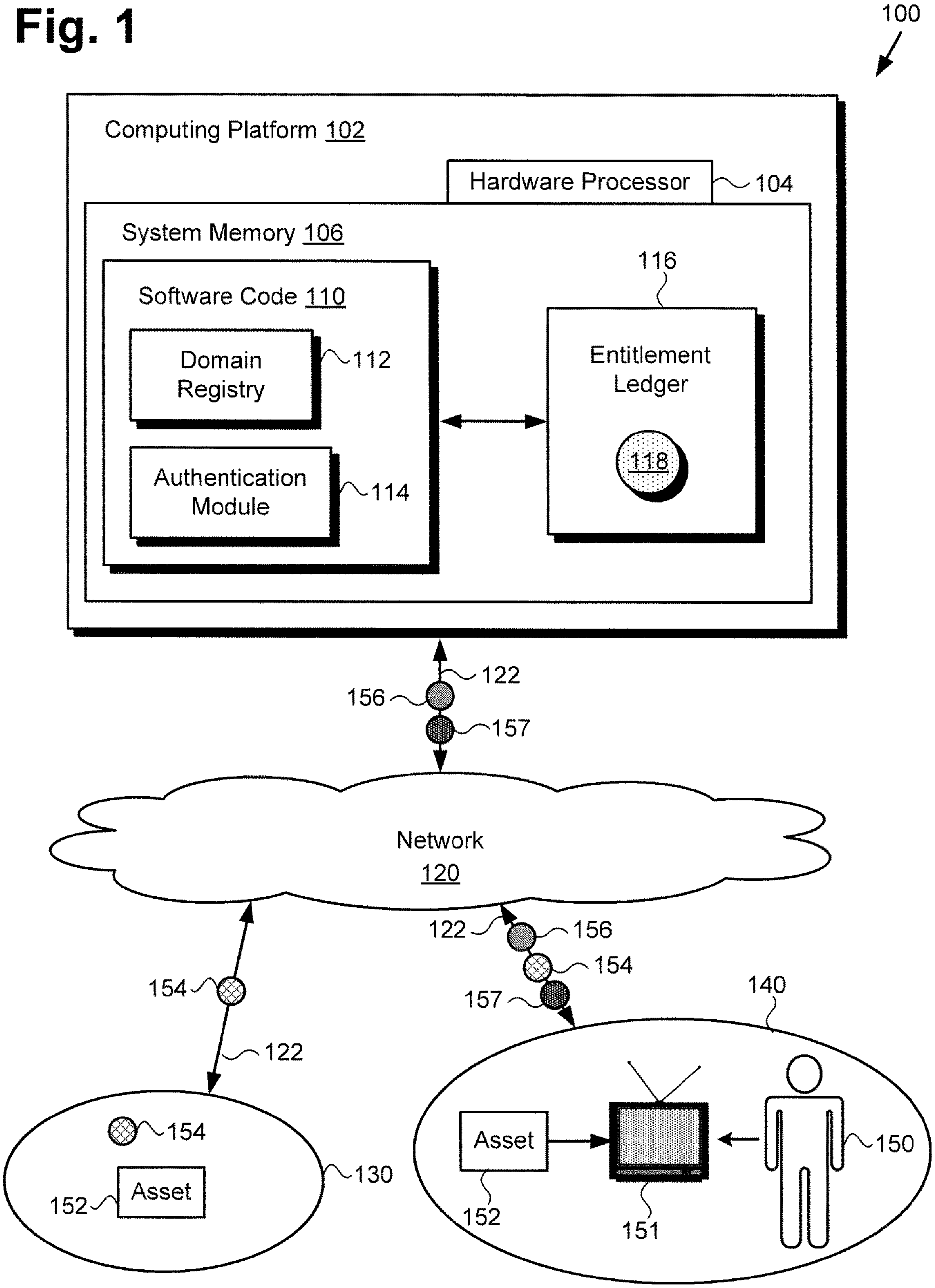
FIG. 1 shows a diagram of an exemplary system for mediating entitlement transfers among affiliated domains, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Relocation, whether undertaken enthusiastically in the pursuit of opportunity, or dutifully in response to employment imposed necessity or a military service obligation, can be an initially jarring and disorienting experience. Consumption and enjoyment of media content that is familiar during such times can be one significant source of reassurance and comfort in an otherwise strange environment. However, due to the obstacles typically encountered by users seeking to access content to which they have acquired an entitlement in their original home country, when residing abroad, international relocation can be particularly disconcerting. For example, a provider of media content will typically distribute media content using different and independent content delivery networks (CDNs) in different international markets. As a result, an entitlement to media content acquired by a user in the United States, for example, may not enable the user to access that media content when residing in another country, and vice versa.

The present application provides a solution for mediating entitlement transfers between affiliated domains that overcomes the drawbacks and deficiencies in the conventional art. It is noted that, as used in the present application, the term "domain" refers to an independently administered network having its own protocols. Moreover, the term "affiliated domains" refers to two or more independently administered networks having common ownership, or common membership in an organization. It is further noted that, as used in the present application, the term "entitlement" refers to any acquired right by a user to access, possess, or utilize an asset. Thus, an entitlement may include one or more of the following: ownership of an asset, a license to utilize an asset, a membership or subscription conferring a right of access to one or more assets, or a rental or lease agreement conferring such a right, for example. Moreover, in some implementations, an entitlement may include a right to utilize a content delivery network (CDN) or other media content distribution infrastructure of a domain.

It is also noted that, as used in the present application, the terms "automation," "automated," and "automating" refer to systems and processes that do not require the participation of a human user, such as a human administrator. Although, in some implementations, a human administrator may intervene in the transfer of an entitlement by the systems and according to the methods described herein, that human involvement is optional. Thus, the methods described in the present application may be performed under the control of hardware processing components of the disclosed systems.

FIG. 1 shows a diagram of an exemplary system for mediating entitlement transfers among affiliated domains, according to one implementation. As shown in FIG. 1, system 100 includes computing platform 102 having hardware processor 104 and system memory 106 implemented as a non-transitory storage device. According to the present exemplary implementation, system memory 106 stores entitlement ledger 116 and software code 110 including domain registry 112 and authentication module 114.

As further shown in FIG. 1, system 100 is implemented within a use environment including communication network 120 including network communication links 122, and respective first and second affiliated domains 130 and 140. According to the exemplary implementation shown in FIG. 1, system 100, first affiliated domain 130, and second affiliated domain 140 are interactively coupled via communication network 120 and network communication links 122.

In addition, FIG. 1 shows asset 152 available in each of first affiliated domain 130 and second affiliated domain 140, entitlement 154, request 156, ledger entry 118, access request 157, and user 150 seeking to access asset 152 in second affiliated domain 140. Also shown in FIG. 1 is user device 151, to which asset 152 may be streamed and/or on which asset 152 may be rendered. Although user device is depicted as a smart television (smart TV) in FIG. 1 for exemplary purposes, user device may take a number of alternative forms. For example, user device 151 may be implemented as a smartphone, tablet computer, laptop or desktop computer, digital media player, or gaming console, to name a few alternatives.

It is noted that although the implementation shown in FIG. 1 depicts system 100 as including two affiliated domains, i.e., domains 130 and 140, that representation is merely exemplary. In practice, system 100 may include more than two affiliated domains, such as tens or hundreds of affiliated domains, for example, each corresponding in general to either of first and second affiliated domains 130 and 140. It is further noted that although the present application refers to software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts software code 110 and entitlement ledger 116 as being commonly stored in system memory 106, that representation is also provided merely as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that entitlement ledger 116 and/or various features of software code 110, such as domain registry 112 and authentication module 114, may be stored and/or executed using the distributed memory and/or processor resources of system 100.

According to the implementation shown by FIG. 1, user 150 has entitlement 154 to asset 152 in first affiliated domain 130 but seeks to access asset 152 in second affiliated domain 140 where user 150 does not have an entitlement to asset 152. Asset 152 may be a vehicle, such as a car, boat, or plane, for example, or may take the form of any other material object of worth or interest. Alternatively, asset 152 may include real property or intellectual property such as a creative work, invention, software code, or data for example. As yet another alternative, asset 152 may include media content, such as a movie or movies, music, TV content, and the like.

System 100 is configured to mediate transfer of entitlement 154 to second affiliated domain 140 to enable user 150 to access asset 152 in second affiliated domain 140. In one such implementation, system 100 may correspond to one or more web servers, accessible over a packet-switched network such as the Internet, for example. Alternatively, system 100 may correspond to one or more computer servers supporting a private wide-area network (WAN), or included in another type of limited distribution network.

In various implementations, transfer of entitlement 154 to second affiliated domain 140 may be recorded in entitlement ledger 116 as ledger entry 118. Ledger entry 118 may provide a persistent record of the transfer of entitlement 154. Moreover entitlement ledger 116 may serve as a reference for the present status of entitlement 154, i.e., indicating whether entitlement 154 is active or has lapsed, for example, as well as identifying user 150 and/or other users having entitlement 154 and the domain or domains in which entitlement 154 may be asserted. In one implementation, entitlement ledger 116 may include a blockchain, for example, as known in the art.

Figure 2:
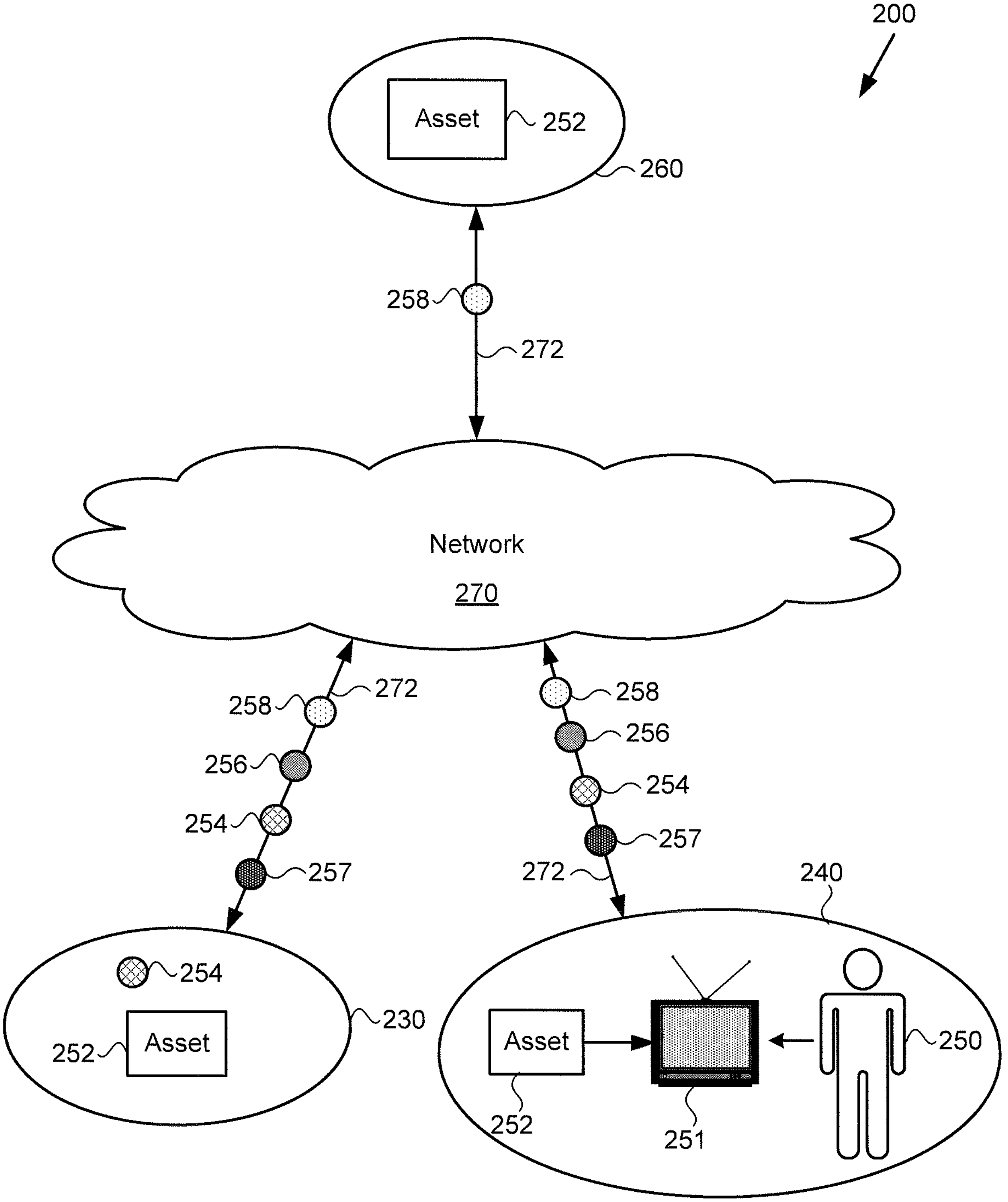
FIG. 2 shows an exemplary system for mediating entitlement transfers among affiliated domains, according to another implementation.

FIG. 2 shows an exemplary system for mediating entitlement transfers among affiliated domains, according to another implementation. As shown in FIG. 2, system 200 includes multiple affiliated domains coupled via communication network 270. Communication network 270 may be a peer-to-peer (P2P) network in which each of first affiliated domain 230, second affiliated domain 240, and third affiliated domain 260 is communicatively coupled to one or more others of affiliated domains 230, 240, and 260 via network communication links 272.

In addition, FIG. 2 shows asset 252 available in each of first affiliated domain 230, second affiliated domain 240, and third affiliated domain 260, entitlement 254, request 256, access request 257, ledger entry broadcast 258, and user 250. Also shown in FIG. 2 is user device 251, to which asset 252 may be streamed and/or on which asset 252 may be rendered. It is noted that, although the implementation shown in FIG. 2 depicts system 200 as including three affiliated domains, i.e., domains 230, 240, and 260, that representation is merely exemplary. In practice, system 200 may include more than three affiliated domains, such as tens or hundreds of affiliated domains, for example, each corresponding to any of first, second, and third affiliated domains 230, 240, and 260.

First affiliated domain 230, second affiliated domain 240, and entitlement 254 correspond respectively in general to first affiliated domain 130, second affiliated domain 140, and entitlement 154, in FIG. 1. Thus, first affiliated domain 230, second affiliated domain 240, and entitlement 254 may share any of the features and functionality attributed to first affiliated domain 130, second affiliated domain 140, and entitlement 154, and vice versa.

Moreover, user device 251, request 256, access request 257, and asset 252, in FIG. 2, correspond respectively in general to user device 151, request 156, access request 157, and asset 152, in FIG. 1. Thus, user device 251, request 256, asset request 257, and asset 252 may share any of the features and functionality attributed to user device 151, request 156, asset request 157, and asset 152, and vice versa. That is to say, asset 252 may be a vehicle, may take the form of any other material object of worth or interest, or may include real property or intellectual property, for example. Alternatively, asset 252 may include media content, such as movie(s) and/or TV content, for example.

Figure 3:
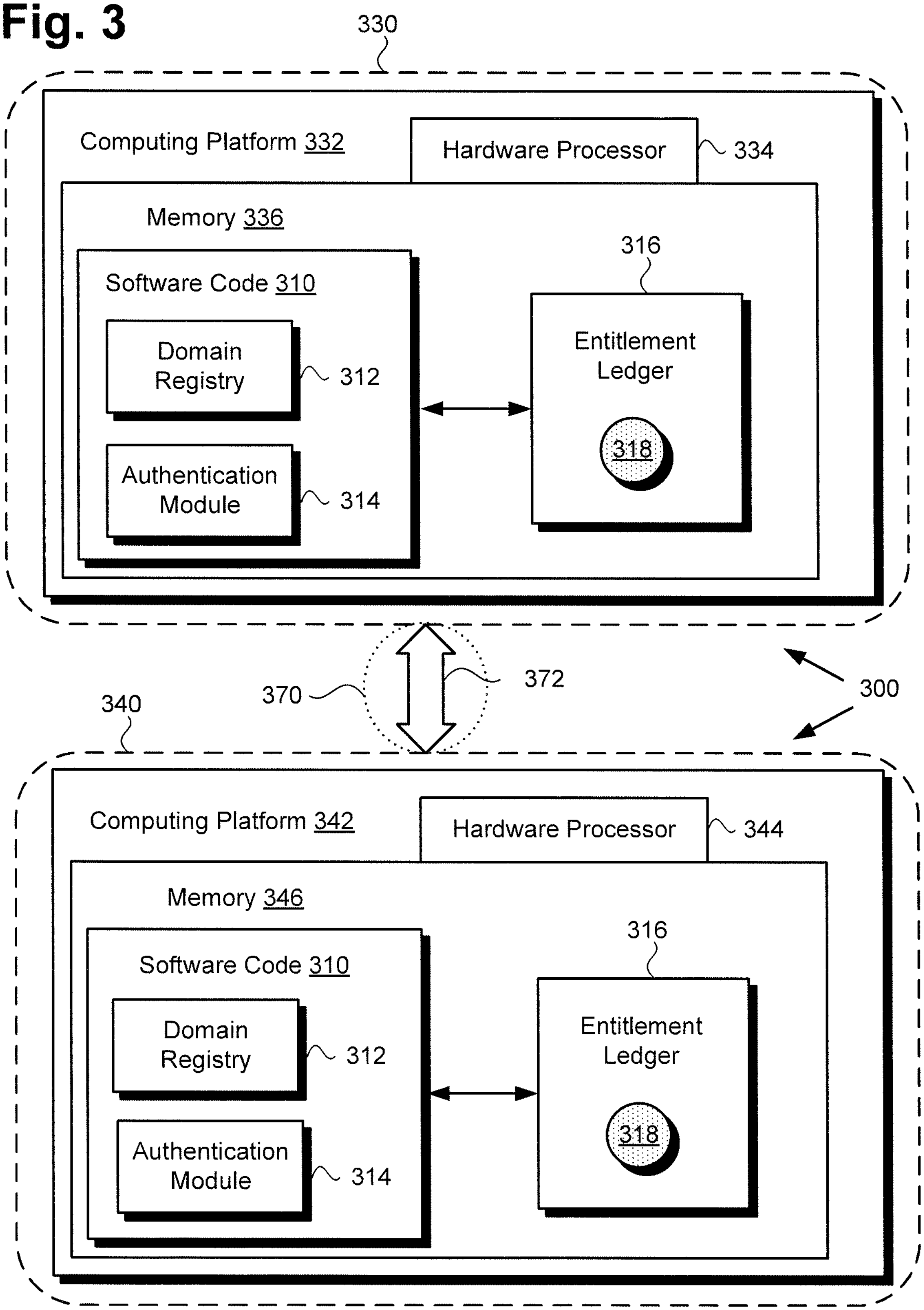
FIG. 3 shows a more detailed diagram of two affiliated domains of the exemplary system shown in FIG. 2.

FIG. 3 shows a more detailed diagram of first and second affiliated domains 330 and 340 corresponding respectively to first and second affiliated domains 230 and 240 of exemplary system 200, in FIG. 2. As shown in FIG. 3, first affiliated domain 330 includes computing platform 332 having hardware processor 334, and memory 336 implemented as a non-transitory storage device storing entitlement ledger 316 and software code 310. As further shown in FIG. 3, second affiliated domain 340 includes computing platform 342 having hardware processor 344, and memory 346 implemented as a non-transitory storage device and also storing entitlement ledger 316 and software code 310. Software code 310 includes domain registry 312 and authentication module 314. Also shown in FIG. 3 are ledger entry 318, communication network 370, and network communication link 372.

System 300 including first affiliated domain 330, second affiliated domain 340, and communication network 370 corresponds to system 200 including first affiliated domain 230, second affiliated domain 240, and communication network 270, in FIG. 2. Thus, system 300 including first affiliated domain 330, second affiliated domain 340, and communication network 370 may share any of the features and functionality attributed to system 200 including first affiliated domain 230, second affiliated domain 240, and communication network 270, and vice versa. In other words, like first affiliated domain 330, first affiliated domain 230 may include computing platform 332 having hardware processor 334, and memory 336 storing entitlement ledger 316 and software code 310. In addition like second affiliated domain 340, second affiliated domain 240 may include computing platform 342 having hardware processor 344, and memory 346 storing entitlement ledger 316 and software code 310.

Communication network 370 and network communication link 372 correspond respectively to communication network 270 and network communication link 272, in FIG. 2. Thus, communication network 370 and network communication links 372 may share any of the features and functionality attributed to communication network 270 and network communication links 272, and vice versa. In other words, like communication network 270, communication network 370 may take the form of a P2P network among first, second, and third affiliated domains 230, 240, and 260. Moreover, as shown in FIG. 3, communication network 270/370 may be a P2P network of the respective computing platforms of those affiliated domains, such as computing platforms 332 and 342, for example.

In addition, entitlement ledger 316 and ledger entry 318, in FIG. 3, correspond respectively in general to entitlement ledger 116 and ledger entry 118, in FIG. 1. Thus, entitlement ledger 316 and ledger entry 318 may share any of the features and functionality attributed to entitlement ledger 116 and ledger entry 118, and vice versa. Moreover, software code 310 including domain registry 312 and authentication module 314 corresponds in general to software coder 110 including domain registry 112 and authentication module 114, in FIG. 1. Thus, software code 310, domain registry 312, and authentication module 314 may share any of the features and functionality attributed to software code 110, domain registry 112, and authentication module 114, and vice versa.

According to the implementation shown by FIGS. 2 and 3, user 250 has entitlement 254 to asset 252 in first affiliated domain 230/330 but seeks to access asset 252 in second affiliated domain 240/340 where user 250 does not have an entitlement to asset 252. System 200/300 is configured to mediate transfer of entitlement 254 to second affiliated domain 240/340 so as to enable user 250 to access asset 252 in second affiliated domain 240/340. In one such implementation, each of first and second affiliated domains 230/330 and 240/340, as well as third affiliated domain 260, may correspond to one or more web servers acting as P2P network nodes and accessible over a packet-switched network such as the Internet, for example. Alternatively, each of first and second affiliated domains 230/330 and 240/340, as well as third affiliated domain 260, may include one or more computer servers participating as P2P network nodes in a private wide-area network (WAN), or included in another type of limited distribution network.

In various implementations, transfer of entitlement 254 to second affiliated domain 240/340 may be recorded in entitlement ledger 316 as ledger entry 318. Ledger entry 318 may provide a persistent record of the transfer of entitlement 254. Moreover entitlement ledger 316 may serve as a reference for the present status of entitlement 254, i.e., indicating whether entitlement 254 is active or has lapsed, for example, identifying user 250 and/or other users having entitlement 254, and identifying the domain or domains in which entitlement 254 may be asserted. In one implementation, entitlement ledger 316 may include a blockchain, for example, as known in the art.

Furthermore, in some implementations, the act of recording ledger entry 318 in entitlement ledger 316 may by substantially concurrently accompanied with broadcasting of ledger entry 318 to some or all other affiliated domains of system 200/300 as ledger entry broadcast 258. For example, in implementations in which ledger entry 318 is first recorded in entitlement ledger 316 of first affiliated domain 230/330, ledger entry broadcast 258 may be transmitted to all other affiliated domains of system 200/300 via communication network 270/370, i.e., second and third affiliated domains 240/340 and 260. As a, result each instantiation of entitlement ledger 316 stored locally in each of the affiliated domains of system 200/300 may be substantially concurrently updated so as to agree with another.

Figure 4:
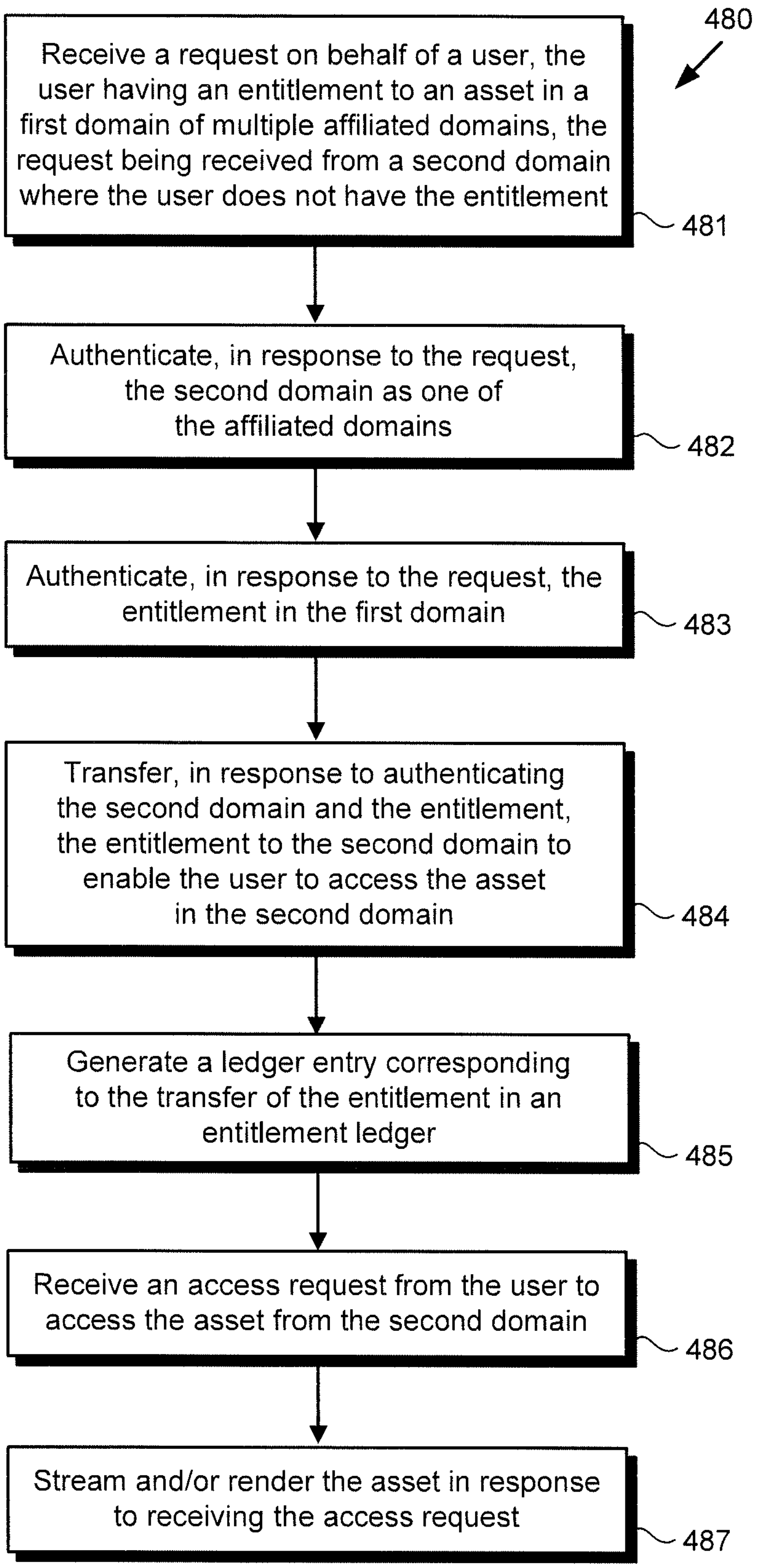
FIG. 4 shows a flowchart presenting an exemplary method for mediating entitlement transfers among affiliated domains, according to one implementation.

The functionality of software code 110/310 will be further described by reference to FIG. 4 in combination with FIGS. 1, 2, and 3. FIG. 4 shows flowchart 480 presenting an exemplary method for mediating entitlement transfers among affiliated domains, according to one implementation. With respect to the method outlined in FIG. 4, it is noted that certain details and features have been left out of flowchart 480 in order not to obscure the discussion of the inventive features in the present application.

Referring now to FIG. 4 in combination with FIGS. 1 and 2, flowchart 480 begins with receiving request 156/256 on behalf of user 150/250, user 150/250 having entitlement 154/254 to asset 152/252 in first affiliated domain 130/230/330, the request being received from second domain 140/240/340 where user 150/250 does not have entitlement 154/254 (action 481). As noted above, asset 152/252 may be a vehicle, may take the form of any other material object of worth or interest, or may include real property or intellectual property, for example. Alternatively, asset 152/252 may include media content, such as movie(s) and/or TV content, for example.

As also noted above, entitlement 154/254 may include any of ownership of asset 152/252, a license to utilize asset 152/252, a membership or subscription conferring a right of access to asset 152/252, or a rental or lease agreement conferring such a right, for example. Moreover, in some implementations, entitlement 154/254 may include a right to utilize a CDN or other media content distribution infrastructure of affiliated domains 130/230/330, 140/240/340, and 260.

Request 156/256 may be received on behalf of user 150/250 from second domain 140/240/340 via one of communication network 120 or 270/370. Request 156/256 may be received by software code 110/310, executed by hardware processor 104 of computing platform 102, or executed by hardware processor 334 of computing platform 332 of first affiliated domain 230/330.

Flowchart 480 continues with authenticating, in response to request 156/256, second domain 140/240/340 as one of affiliated domains 130/230/330, 140/240/340, and 260 (action 482). Second affiliated domain 140/240/340 may be authenticated by software code 110/310, executed by hardware processor 104 of computing platform 102, or executed by hardware processor 334 of computing platform 332 of first affiliated domain 230/330, and using authentication module 114/314. In one implementation, for example authentication module 114/314 may authenticate second affiliated domain 140/240/340 by reference to domain registry 112/312, which may include identification data for all of affiliated domains 130/230/330, 140/240/340, and 260.

Flowchart 480 continues with authenticating, in response to request 156/256, entitlement 154/254 in first affiliated domain 130/230/330 (action 483). Entitlement 154/254 may be authenticated by software code 110/310, executed by hardware processor 104 of computing platform 102, or executed by hardware processor 334 of computing platform 332 of first affiliated domain 230/330, and using authentication module 114/314. Entitlement 154/254 may be authenticated by authentication module 114/314 by reference to entitlement ledger 116/316, for example.

Flowchart 480 continues with transferring, in response to authenticating second affiliated domain 140/240/340 and entitlement 154/254, entitlement 154/254 to second affiliated domain 140/240/340 to enable user 150/250 to access asset 152/252 in second affiliated domain 140/240/340 (action 484). For example, where entitlement 154/254 includes a right of user 150/250 to utilize a CDN of first affiliated domain 130/230/330, transfer of entitlement 154/254 to second affiliated domain 140/240/340 may endow user 150/250 with a right to utilize a CDN of second affiliated domain 140/240/340 corresponding to the CDN of first affiliated domain 130/230/330.

In some implementations, transfer of entitlement 154/254 to second affiliated domain 140/240/340 results in user 150/250 having entitlement 154/254 to asset 152/252 in second affiliated domain 140/240/340, but not in first affiliated domain 130/230/330. That is to say, in those implementations, transfer of entitlement 154/254 to second affiliated domain 140/240/340 causes entitlement 154/254 to lapse, either permanently or temporarily, in first affiliated domain 130/230/330.

Alternatively, in some implementations, transfer of entitlement 154/254 to second affiliated domain 140/240/340 results in user 150/250 having entitlement 154/254 to asset 152/252 in second affiliated domain 140/240/340 while retaining entitlement 154/254 in first affiliated domain 130/230/330. In other words, in some to implementations, transfer of entitlement 154/254 to one or more other affiliated domains can result in replication of entitlement 154/254 in each of those respective affiliated domains. Entitlement 154/254 may be transferred to second affiliated domains 140/240/340 by software code 110/310, executed by hardware processor 104 of computing platform 102, or executed by hardware processor 334 of computing platform 332 of first affiliated domain 230/330, and via communication network 120/270/370.

Flowchart 480 continues with generating ledger entry 118/318 corresponding to the transfer of entitlement 154/254, in entitlement ledger 116/316 (action 485). Generation of ledger entry 118/318 may be performed by software code 110/310, executed by hardware processor 104 of computing platform 102, or executed by hardware processor 334 of computing platform 332 of first affiliated domain 230/330.

Although not included in flowchart 480, in implementations in which communication network 270/370 takes the form of a P2P network, the present method can further include broadcasting ledger entry 118/318 to all other affiliated domains 140/240/340 and 260 via communication network 270/370, for example as ledger entry broadcast 258. As shown by FIG. 3, broadcasting of ledger entry 118/318 to other affiliated domains of system 200/300, such as second affiliated domain 240/340, results in entitlement ledger 316, which may be a distributed ledger persistently stored on each of the affiliated domains of system 200/300, being updated in real-time. That is to say, ledger entry 118/318, generated in response to transfer of entitlement 154/254 to second affiliated domain 140/240/340, can be propagated into each version of distributed entitlement ledger 316 substantially concurrently.

It is noted that, in some implementations, flowchart 480 may conclude with action 485, or with the subsequent broadcasting of ledger entry 118/318 described above. However, in some implementations, flowchart 480 can continue with receiving access request 157/257 from user 150/250 to access asset 152/252 from second affiliated domain 140/240/340 (action 486). Access request 157/257 may be received from user 150/250 via one of communication network 120 or 270/370. Access request 157/257 may be received by software code 110/310, executed by hardware processor 104 of computing platform 102, or executed by hardware processor 334 of computing platform 332 of first affiliated domain 230/330.

Flowchart 480 can conclude with one or more of streaming and rendering asset 152/252 in response to receiving access request 157/257 (action 487). As noted above, asset 152/252 may take the form of media content, such as movie(s) and/or TV content, for example. In those implementations, asset 152/252 may be streamed to user device 151/251 via one of communication network 120 or 270/370. Moreover, in those implementations, asset 152/252 may be rendered on user device 151/251.

Asset 152/252 may be streamed to user device 151/251 by software code 110/310, executed by hardware processor 104 of computing platform 102, or executed by hardware processor 334 of computing platform 332 of first affiliated domain 230/330. Asset 152/252 may be rendered on user device 151/251, by user device 151/251, in response to streaming of asset 152/252 by software code 110/310.

It is emphasized that the method presented by flowchart 480 can be used to automate the transfer of entitlement 154/254 between or among affiliated domains 130/230/330, 140/240/340, and 260 in response to request 156/256. As a result, the present inventive concepts advantageously enable user 150/250 to exercise an entitlement acquired in first affiliated domain 130/230/330 in one or more other affiliated domains, without requiring the intervention or assistance of a human system administrator.

Thus, the present application discloses a solution for mediating entitlement transfers between affiliated domains. The present solution includes receiving a request for an asset on behalf of a user having an entitlement to the asset in a first of multiple affiliated domains, the request being received from a second domain where the user does not have the entitlement. The present solution also includes authenticating, in response to the request, the second domain as one of the affiliated domains, authenticating, also in response to the request, the entitlement in the first domain. The authenticated entitlement can then be transferred to the second domain, thereby advantageously enabling the user to access the asset in the second domain. The present solution further includes generating a ledger entry corresponding to the transfer in an entitlement ledger providing a persistent record of transfers of the entitlement, as well as the present status of the entitlement.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations is described herein, but many rearrangements, modifications, and substitutions are possible without departing from the scope of the present disclosure.

What is claimed is:

1. A system for transferring a right of a user to access a media content in a first domain of a plurality of affiliated domains to a second domain of the plurality of affiliated domains, the system comprising:

one or more hardware processors; and an entitlement database stored in a system memory, the system memory further storing a software code including a domain registry and an authentication module, the domain registry including identification data for the plurality of affiliated domains;

the one or more hardware processors configured to execute computer instructions to:

receive, via a communication network from the second domain, a request to transfer the right of the user to access the media content that is available to the user in the first domain to the second domain, wherein the media content is also available in the second domain, wherein the user does not have the right to access the media content in the second domain;

authenticate, in response to the request, the second domain by executing the authentication module to reference the domain registry, thereby identifying the second domain as being affiliated with the first domain;

authenticate, in response to the request, the right of the user to access the media content in the first domain by executing the authentication module to reference the entitlement database identifying the user as having the right to access the media content in the first domain;

transfer, via the communication network in response to authenticating the second domain and authenticating the right of the user to access the media content in the first domain, the right of the user to access the media content in the first domain to the second domain to enable the user to access the media content in the second domain;

generate, in the entitlement database, a database entry corresponding to transferring the right of the user to access the media content in the first domain to the second domain, wherein the right of the user to access the media content in the second domain includes a right of the user to utilize a media content infrastructure of the second domain;

broadcast, via the communication network, the database entry to the plurality of affiliated domains, wherein the entitlement database and another respective entitlement database stored in each of the plurality of affiliated domains are contemporaneously updated using the database entry in real-time so as to agree, each entitlement database being a respective instantiation of a distributed entitlement database; and stream, after transferring the right of the user to access the media content in the first domain to the second domain, the media content to the user via the communication network and the second domain.

2. The system of claim 1, wherein the transfer results in the user having the right of the user to access the media content in the second domain, and the user no longer having the right to access the media content in the first domain.

3. The system of claim 1, wherein the transfer results in the user having the right of the user to access the media content in the second domain while the user retaining the right of the user to access the media content in the first domain.

4. The system of claim 1, wherein the media content is stored in both the first domain and the second domain.

5. The system of claim 1, wherein the first domain and the second domain are commonly owned and have different independently administered content delivery networks with own corresponding protocols.

6. A system comprising:

a plurality of affiliated domains, including a first domain and a second domain, communicatively coupled via a communication network;

each of the plurality of affiliated domains including a respective computing platform having a hardware processor and a memory storing an entitlement database and a software code including a domain registry and an authentication module, the domain registry including identification data for the plurality of affiliated domains;

wherein the hardware processor of the first domain of the plurality of affiliated domains is configured to execute the software code of the first domain to:

receive, from the second domain, a request to transfer a right of a user to access the media content that is available to the user in the first domain to the second domain, wherein the media content is also available in the second domain, wherein the user does not have the right to access the media content in the second domain;

authenticate, in response to the request, the second domain by executing the authentication module to reference the domain registry, thereby identifying the second domain as being affiliated with the first domain;

authenticate, in response to the request, the right of the user to access the media content in the first domain by executing the authentication module to reference the entitlement database identifying the user as having the right to access the media content in the first domain;

transfer, in response to authenticating the second domain and authenticating the right of the user to access the media content in the first domain, the right of the user to access the media content in the first domain to the second domain to enable the user to access the media content in the second domain;

generate, in the entitlement database, a database entry corresponding to transferring the right of the user to access the media content in the first domain to the second domain, wherein the right of the user to access the media content in the second domain includes a right of the user to utilize a media content infrastructure of the second domain; and broadcast the database entry to others of the plurality of affiliated domains via the communication network, wherein the respective entitlement databases of each of the plurality of affiliated domains are contemporaneously updated using the database entry in real-time so as to agree, each entitlement database being a respective instantiation of a distributed entitlement database;

wherein the hardware processor of the second domain is configured to execute the software code of the second domain to stream, after transferring the right of the user to access the media content in the first domain to the second domain, the media content to the user via the second domain.

7. The system of claim 6, wherein the communication network is a peer-to-peer (P2P) network of the respective computing platforms of the plurality of affiliated domains.

8. The system of claim 6, wherein the transfer results in the user having the right of the user to access the media content in the second domain, and the user no longer having the right to access the media content in the first domain.

9. The system of claim 6, wherein the transfer results in the user having the right of the user to access the media content in the second domain while the user retaining the right of the user to access the media content in the first domain.

10. The system of claim 6, wherein the media content is stored in both the first domain and the second domain.

11. The system of claim 6, wherein the first domain and the second domain are commonly owned and have different independently administered content delivery networks with own corresponding protocols.

12. A system for transferring a right of a user to access a media content in a first affiliated domain of a plurality of affiliated domains to a second affiliated domain of the plurality of affiliated domains, the system comprising:

the first affiliated domain including:

a first computing platform including a first hardware processor and a first system memory; and a first entitlement database of a distributed entitlement database, and a software code including a domain registry and an authentication module stored in the first system memory, the domain registry including identification data for the plurality of affiliated domains;

the second affiliated domain including:

a second computing platform including a second hardware processor and a second system memory; and a second software code and a second entitlement database of the distributed entitlement database stored in the second system memory;

the second hardware processor configured to execute the second software code to:

receive a first request from a user device of the user to transfer the right of the user to access the media content that is available to the user in the first affiliated domain to the second affiliated domain, wherein the media content is also available in the second affiliated domain, and wherein the user does not have the right to access the media content in the second affiliated domain; and in response to receiving the first request, send a second request to the first affiliated domain for enabling the user using the user device to access the media content in the second affiliated domain;

the first hardware processor configured to execute the first software code to:

receive the second request on behalf of the user using the user device from the second affiliated domain;

authenticate, in response to the second request, the second affiliated domain by executing the authentication module to reference the domain registry, thereby identifying the second affiliated domain as being affiliated with the first affiliated domain;

authenticate, in response to the second request, by executing the authentication module to reference the first entitlement database, that the user has the right to access the media content in the first affiliated domain;

transfer, in response to authenticating the second affiliated domain and authenticating the right of the user to access the media content in the first affiliated domain, the right of the user to access the media content in the first affiliated domain to the second affiliated domain to enable the user to access the media content in the second affiliated domain;

generate, in the first entitlement database, a database entry corresponding to transferring the right of the user to access the media content in the first affiliated domain to the second affiliated domain, wherein the right of the user to access the media content in the second domain includes a right of the user to utilize a media content infrastructure of the second domain; and broadcast the database entry to the second affiliated domain, wherein the first entitlement database and the second entitlement database are contemporaneously updated using the database entry in real-time so as to agree.

13. The system of claim 12, wherein the second hardware processor is further configured to execute the second software code to:

stream, after transferring the right of the user to access the media content in the first affiliated domain to the second affiliated domain, the media content to the user device using a second independently administered content delivery network of the second affiliated domain different than a first independently administered content delivery network of the first affiliated domain.

14. The system of claim 12, wherein the transfer results in the user having the right of the user to access the media content in the second affiliated domain, and the user no longer having the right to access the media content in the first affiliated domain.

15. The system of claim 12, wherein the transfer results in the user having the right of the user to access the media content in the second affiliated domain while the user retaining the right of the user to access the media content in the first affiliated domain.

16. The system of claim 12, wherein the media content is stored in both the first affiliated domain and the second affiliated domain.

* * * * *